July 19, 1932.   H. PFANNENSTIEHL   1,868,366
DRIVING MECHANISM
Filed June 23, 1928   2 Sheets-Sheet 1

INVENTOR
HARRY PFANNENSTIEHL
BY
G. H. Heydt
ATTORNEY

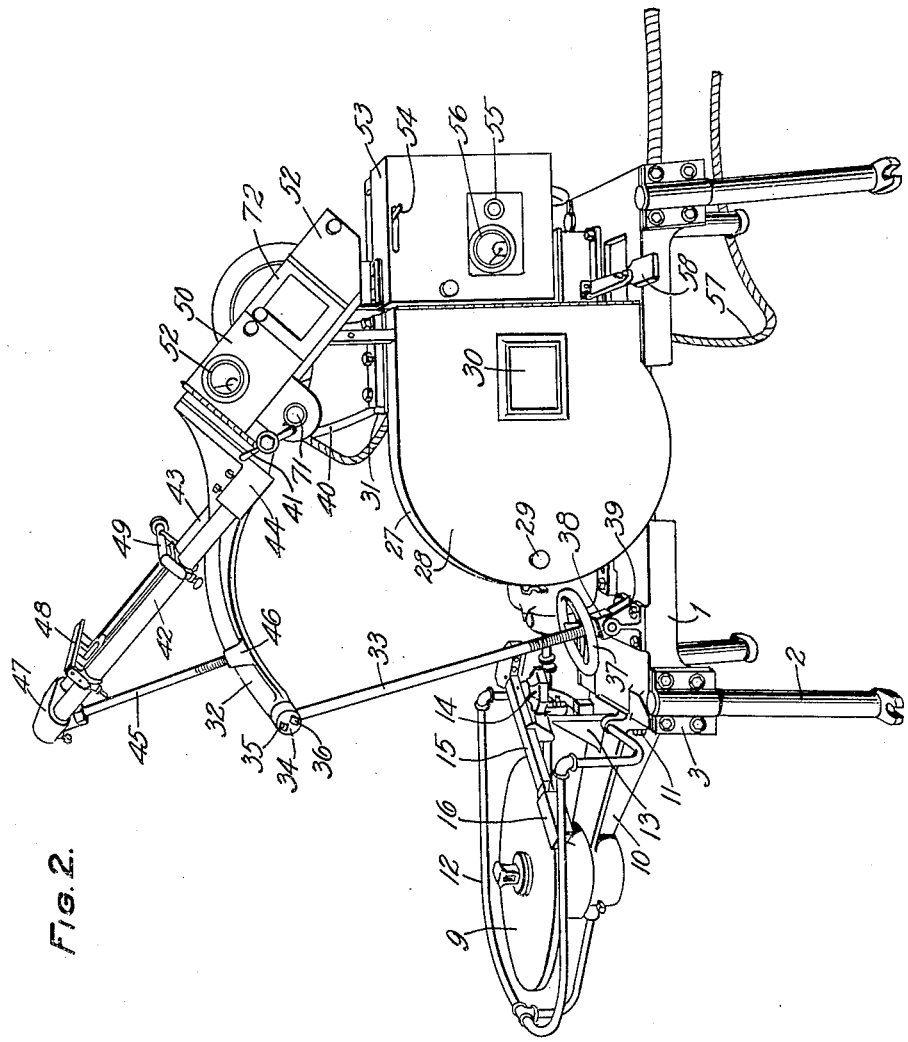

Patented July 19, 1932

1,868,366

UNITED STATES PATENT OFFICE

HARRY PFANNENSTIEHL, OF MOUNTAIN LAKES, NEW JERSEY, ASSIGNOR TO BELL TELEPHONE LABORATORIES, INCORPORATED, OF NEW YORK, N. Y., A CORPORATION OF NEW YORK

DRIVING MECHANISM

Application filed June 23, 1928. Serial No. 287,731.

This invention relates to driving mechanisms for linking a prime mover with driven apparatus in situations where at times it will be necessary to change the angular space relation of the driven member with respect to the prime mover. The device was developed for use in motion picture projection apparatus in which the projector head must be arranged to be tilted to a suitable projecting angle in accordance with the location in which it is to be used. When the driving motor is mounted on the base of the machine, it is obvious that the driving linkage must be to some extent adjustable in order to compensate for the relative movement between the projector head and the base portion. The inventive idea may be applied to various types of machinery and it is to be understood that the scope of the invention is to be limited by the claims only.

In providing a driving linkage between a prime mover and a driven member in which relative motion between the two takes place, the use of universal joints and a telescoping shaft logically suggests itself and is an arrangement well understood in the art. When a universal joint is used, torque irregularities are introduced which will be increased as the angle between the shafts coupled by the universal joint is increased.

It is the object of this invention to neutralize the torque irregularities of universal joints in driving systems of the type just discussed.

A feature of the invention is an arrangement in which a driving linkage is provided consisting of a driving shaft having three sections and in which the end sections are coupled to the central section by means of two universal joints and in which provision is made to maintain the end sections of said shaft axially parallel regardless of the relative positions in space of the prime mover and driven mechanism.

A further feature of the invention provides means whereby the driving shaft may be clamped in position with the end sections axially parallel in which position the torque irregularities of one universal joint act to neutralize the torque irregularities of the second universal joint.

A more complete understanding of the invention may be had from the following detailed description, reference being had to the accompanying drawings.

In the drawings, Fig. 1 is a perspective view of a motion picture projector equipped with sound reproducing devices arranged for synchronous operation therewith. The projector embodies a driving connection in accordance with the principles of this invention.

Fig. 2 is a perspective view of the base of the machine on which the motion picture projector may be mounted. This base shows the method of mounting various forms of sound reproducing equipment.

Figures 1, 3:
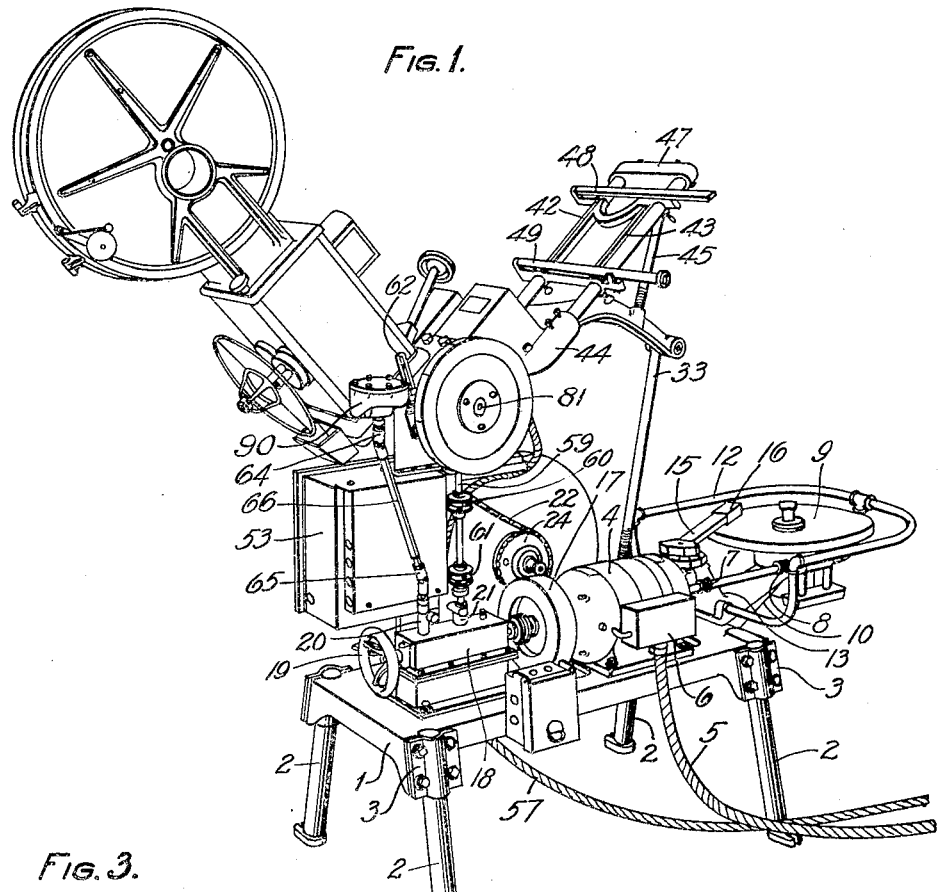
Fig. 3 is a view showing in detail the arrangement whereby the upper gear housing in which the driving link terminates may be rotated and clamped in proper position so that the end sections of the driving shaft may be maintained axially parallel.

Referring now to Fig. 1, a general description of the apparatus will be given in order that the utility of the driving link may be more apparent. A bed plate 1 is mounted on four legs 2 and may be adjusted as to height above the floor by means of clamping saddles 3. A driving motor 4 is mounted on the bed plate and is supplied with power from a cable 5 which terminates in a connection box 6. The motor 4 drives a rearwardly extending shaft which is connected by means of flexible joints 7 and 8 to a phonograph turntable 9. Power is transmitted to the turntable 9 through a mechanical filter of known construction which tends to smooth out torque irregularities in the driving shaft. The turntable 9 is supported by bracket 10 which may be bolted to the bed plate 1 by means of bolts 11, one of which may be seen in Fig. 2. A guard rail 12 is suitably secured to the bracket 10 to protect the turntable 9 from interference. A standard 13 extends upwardly from bracket 10 and has mounted thereon a base 14 on which is pivoted an arm 15 to one end of which is connected an electrical phonograph reproducer 16. The phonograph equipment just described may be removed by the removal of bolts 11 and disconnection of the shaft to motor 4. It is, of course, obvious that the connections to the electrical phonograph reproducer must also be disconnected.

The motor 4 at its front end transmits power through a steadying fly wheel 17 to a gear box 18. The main shaft driven by motor 4 extends through the gear box 18 and has secured thereto a hand wheel 19 by means of which the device may be turned over slowly by hand. The gear box 18 is provided with suitable gear connections so that vertical spindles 20 and 21 are rotated upon rotation of the motor. A third spindle, not shown, forms a horizontal shaft upon which a sprocket is mounted to drive roller chain 22 which cooperates with the sprocket 24 of the friction clutch which drives the shaft on which the film take-up reel may be mounted.

A magazine 27 is provided to house the take-up reel. The position of this magazine may be best seen in Fig. 2. The magazine is provided with a door 28 which may be opened by means of a handle 29. A window is provided by means of which a view of the interior of the magazine may be had when the machine is in motion. The magazine 27 consists of a rather rugged casting and includes a back plate which terminates at the forward edge in a double flange extending to either side. One of the flanges forms the forward side of the magazine. The magazine is bolted to the bed plate 1 at convenient points and in combination with the flanges just described serves as a mounting for other parts of the apparatus. A bracket 31 is bolted to the top of the magazine 27 and is provided in its upper forward portion with suitable trunnions which support the pivoted superstructure or upper base which carries the projector head and film sound reproducing equipment.

The upper base consists of a frame with suitable trunnions to cooperate with a bushing carried by bracket 31. A curved operating member 32 forms a portion of the upper base and provides means whereby the projector head may be tilted to any desired angle. A bar 33 is arranged to slide through a clamping member 34 suitably trunnioned in the end of arm 32. The member 34 is arranged for rotation in its journals to allow for angular changes between the bar 33 and arm 32 when the upper base is raised or lowered. Set screws 35 and 36 serve to clamp the bar in adjusted position with respect to arm 32. The lower end of bar 33 is threaded into a nut which may be turned by means of a handwheel 37. The handwheel 37 and nut are rotatably mounted in a block 38 but are held against longitudinal motion therein. The block 38 is suitably trunnioned to standards 39 which are bolted to the bed plate 1. By means of the handwheel 37 an exact tilting angle may be reached after the upper base has been brought into approximate position by simply lifting it into such approximate position and then clamping it by means of screws 35 and 36. In order to stabilize the machine and prevent any vibration which might occur in case the main pivot point became worn a secondary clamping device is provided. This clamping device is arranged to grip a sector 40 which forms a rear wall for bracket 31. A T-handle 41 rotates a threaded shaft and draws a threaded block against one edge of the sector 40 to firmly clamp the upper base in adjusted position.

Continuing the description of Fig. 2 it will be seen that a support for a projector arc lamp is provided in the rear of the upper base portion. This support consists of two tubular members 42 and 43 which are mounted in sockets 44 by means of clamping set screws. Support and rigidity are given to the support for the lamp by means of a brace 45 which is fitted at one end into a socket 46 on arm 32. The tubular members 42 and 43 are stiffened and held in alignment in the rear by means of a strap 47 into which they are secured by means of a socket and set screw arrangement. The supports for the arc lamp housing are adjustably mounted on rods 42 and 43 and are shown at 48 and 49.

The upper base portion is provided with compartments 50, 51 and 52 for housing various parts of the film sound reproducing equipment.

The sound reproducing equipment consists of a constant intensity lamp, an optical system by means of which a narrow band of light from said lamp is focused on the film as it passes an aperture plate and a photoelectric cell whose current output is varied in accordance with the film density variations. The lamp is housed in compartment 50 and its intensity may be regulated by means of a rheostat 71. The amount of current supplied to the lamp may be checked by means of a meter 72 mounted on the door of the compartment.

A glass door provides access to compartment 51, which houses the lens tube assembly whereby the narrow band of light is projected over the film. This compartment also houses the driving sprocket for imparting motion to the film, and various guide rollers. The photoelectric cell is housed in compartment 52 which is also provided with a door for convenient access thereto.

The driving sprocket of the sound reproducing attachment is mounted on a shaft passing through the bushing which forms the axis on which the upper base portion may be rotated above the main base. It is therefore obvious that tilting the upper base portion has no effect on the drive for the film sound reproducing equipment since their axes are coincident.

A vacuum tube amplifier is mounted in the box 53 which is provided with a compartment door in which a switch handle 54 appears at a convenient point. A controlling rheostat for the amplifier is shown at 55 and a meter is indicated at 56. This amplifier is housed as a preliminary amplifier to provide amplification for the relatively feeble output of the photoelectric cell. It is necessary to provide this amplifier in order to bring the output of the photoelectric cell up to a point where it is comparable with the output of the phonograph reproducer 16. Electrical connections to the amplifier and sound reproducing equipment are brought to the machine by means of an armored cable containing a number of conductors. This cable is indicated at 57.

A pedal 58 is provided to control the starting and stopping of the machine. Lifting the pedal releases a brake shoe which cooperates with flywheel 17, Fig. 1, and at the same time operates an electric switch to close the circuits of motor 4. Depression of the pedal opens the circuit of motor 4 and continued movement downward applies the brake shoe to the outer surface of flywheel 17 to quickly slow down and stop the machine.

Referring now to Fig. 1 flywheel 81 is secured to the shaft which drives the feed sprocket of the film sound reproducing device. This flywheel is driven through suitably damped springs by means of a spider which in turn is driven from a bevel gear arrangement actuated by vertical shaft 59. The shaft 59 is connected to vertical spindle 21 by means of suitable coupling members 60 and 61.

Fig. 1 shows a standard projector head mounted on the upper base portion. This projector head forms no part of the invention and will not be described in detail. It should be noted, however, that by means of suitable adapter plates any standard make of projector head may be secured to the upper base portion.

The driving mechanism for the projector heads is of such a nature that it may be adjusted to operate properly irrespective of the type of head used or of the tilting angle to which the upper base is set. A case 90 forms a housing for bevel gears one of which is secured to the main driving shaft of the projector head. The housing 90 is provided with an arm 91 which cooperates with a slotted link 62 suitably secured to the main frame to form a clamping device for maintaining the gear housing in adjusted position. The vertical shaft 63 which drives the bevel gears is connected with the vertical driving spindle 20 by means of two universal joints 64 and 65. These universal joints may be of any well known construction. In order to allow angular motion of the upper base portion or to compensate for variations in the location of the driving shaft of various types of projector heads the central portion 66 of the driving link is made extendible, and may telescope upon itself. As seen in Fig. 1 the shaft 66 comprises an outer sleeve portion and an inner driving portion each square in section. Since the two portions of the shaft are square in section they will rotate as one regardless of the extent to which the shaft is extended.

As was previously pointed out the purpose of making the upper gear housing 90 pivotable about the axis of the driving shaft for the projector is to enable the end sections of the driving linkage to be maintained axially parallel so that the torque irregularities of one universal joint will neutralize the torque irregularities of the other. After the machine is set up and tilted to the desired angle the gear housing 90 is rotated about its axis until the end sections of the driving linkage are parallel. The housing is then clamped in adjusted position by means of set screws 67 and 68. The set screw 67 is threaded into arm 91 and set screw 68 is threaded into a convenient portion of the frame of the lower base portion. Inspection and adjustment of the upper bevel gears may be made by removing the housing cover 69 secured to housing 90 by means of screws 70.

What is claimed is:

1. A driving shaft comprising a middle and two end sections, two universal joints connecting the middle section with the end sections, mechanism driven from one of said end sections and a prime mover connected to the other end section, means to change the angular space relation between said prime mover and said driven mechanism, and an adjustable compensating device operable to maintain said end sections in axially parallel relation for any selected space relation of said prime mover and said driven mechanism.

2. A prime mover, a driven mechanism, a driving shaft interconnecting said prime mover and driven mechanism, said shaft comprising a midde and two end sections and two universal joints interconnecting said sections, and means to mutually neutralize torque irregularities due to universal joint action, said means including an adjustable compensating device which maintains the end sections of said shaft axially parallel regardless of the angular space relation of said prime mover and said driven mechanism.

3. A driving shaft comprising a middle and two end sections, two universal joints connecting said middle section with said end sections, mechanism driven from one of said end sections and a prime mover connected to the other end section, means to change the angular space relation between said prime mover and said driven mechanism, a compensating device operable to maintain said end sections in axially parallel relation, and means to clamp said compensating device in a desired position.

4. A driving shaft comprising a middle and two end sections, two universal joints connecting the middle section with the end sections, mechanism driven from one of said end sections and a prime mover connected to the other end section, means to change the angular space relation between said prime mover and said driven mechanism, said middle section of said shaft being telescopic to permit said change, and a compensating device adjustable to maintain said end sections in axially parallel relation.

In witness whereof I hereunto subscribe my name this 22d day of June, 1928.

HARRY PFANNENSTIEHL.